(12) United States Patent  (10) Patent No.: US 9,291,851 B2
Tamaki et al.  (45) Date of Patent: Mar. 22, 2016

(54) DISPLAY AND ELECTRONIC UNIT

(75) Inventors: Masaya Tamaki, Kanagawa (JP); Yoko Fukunaga, Kanagawa (JP)

(73) Assignee: Japan Display Inc., Tokyo (JP)

( * ) Notice: Subject to any disclaimer, the term of this patent is extended or adjusted under 35 U.S.C. 154(b) by 918 days.

(21) Appl. No.: 13/415,615

(22) Filed: Mar. 8, 2012

(65) Prior Publication Data

US 2012/0250158 A1  Oct. 4, 2012

(30) Foreign Application Priority Data

Mar. 30, 2011 (JP) ................................. 2011-075472

(51) Int. Cl.
*F21V 8/00* (2006.01)
*G02F 1/1335* (2006.01)

(52) U.S. Cl.
CPC ........ *G02F 1/133553* (2013.01); *G02B 6/0051* (2013.01); *G02F 1/133504* (2013.01)

(58) Field of Classification Search
CPC .......... G02F 1/113504; G02F 1/33606; G02F 2001/113507; G02B 6/0051
USPC ......... 359/577–590, 599, 501, 609, 613–614; 349/113, 1, 5, 11, 12; 362/317, 351, 362/355, 311.01, 311.03–311.06
See application file for complete search history.

(56) References Cited

U.S. PATENT DOCUMENTS

| | | | |
|---|---|---|---|
| 5,342,545 A * | 8/1994 | Yamada et al. | 252/299.01 |
| 6,424,395 B1 | 7/2002 | Sato et al. | |
| 6,933,994 B1 | 8/2005 | Kaneko et al. | |
| 8,033,674 B1 * | 10/2011 | Coleman et al. | 362/19 |
| 2003/0048398 A1 * | 3/2003 | Maeda et al. | 349/113 |
| 2004/0257506 A1 | 12/2004 | Tashiro et al. | |
| 2005/0018303 A1 | 1/2005 | Harada | |
| 2006/0055856 A1 | 3/2006 | Tashiro et al. | |
| 2006/0061714 A1 | 3/2006 | Tashiro et al. | |
| 2007/0291366 A1 | 12/2007 | Murata et al. | |

FOREIGN PATENT DOCUMENTS

| | | |
|---|---|---|
| EP | 0949515 | 10/1999 |
| EP | 1156359 | 11/2001 |
| EP | 1462825 | 9/2004 |
| EP | 1806603 | 7/2007 |
| JP | 09096705 | 4/1997 |
| JP | HEI 09-113893 | 5/1997 |
| JP | HEI 11-237623 | 8/1999 |
| JP | 2000-275408 | 10/2000 |
| JP | 2010044320 | 2/2010 |
| WO | 2008053592 | 5/2008 |

OTHER PUBLICATIONS

Extended European Search Report dated Nov. 22, 2013 in corresponding European Patent Application No. 12002043.3.
Japanese Office Action issued Sep. 9, 2014 in corresponding Japanese Application No. 2011-075472.

* cited by examiner

*Primary Examiner* — Kimberly N Kakalec
(74) *Attorney, Agent, or Firm* — K&L Gates LLP

(57) ABSTRACT

A display capable of obtaining high luminance in white display and an electronic unit are provided. The display includes: a reflective display panel; and an optical laminate disposed on the display panel, in which the optical laminate includes a plurality of anisotropic scattering films, and transmittances in a scattering central axis direction of two or more films of the plurality of anisotropic scattering films are different from each other.

10 Claims, 11 Drawing Sheets

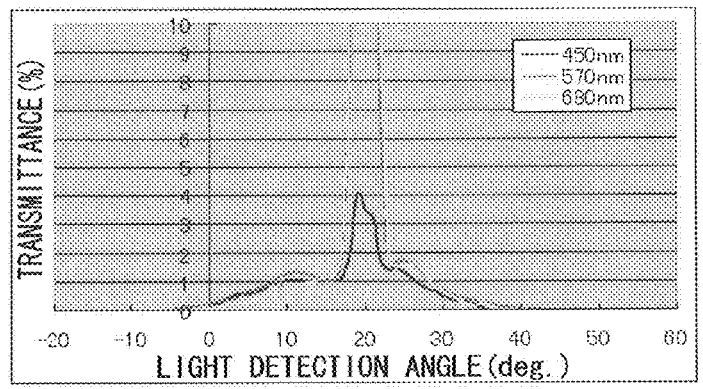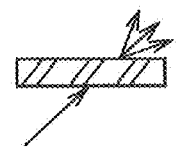
FIG. 7A
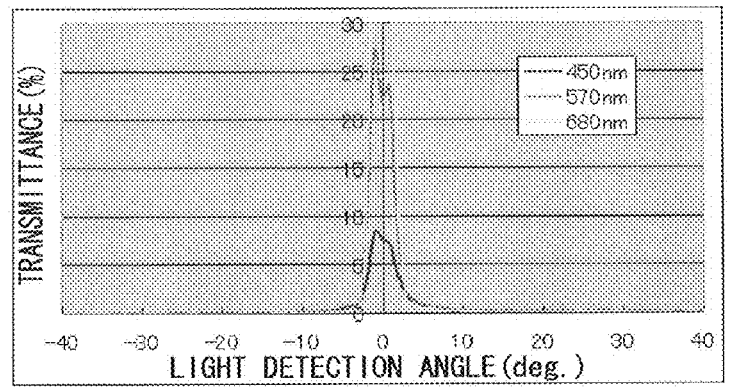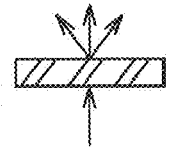
FIG. 7B

FIG. 8A 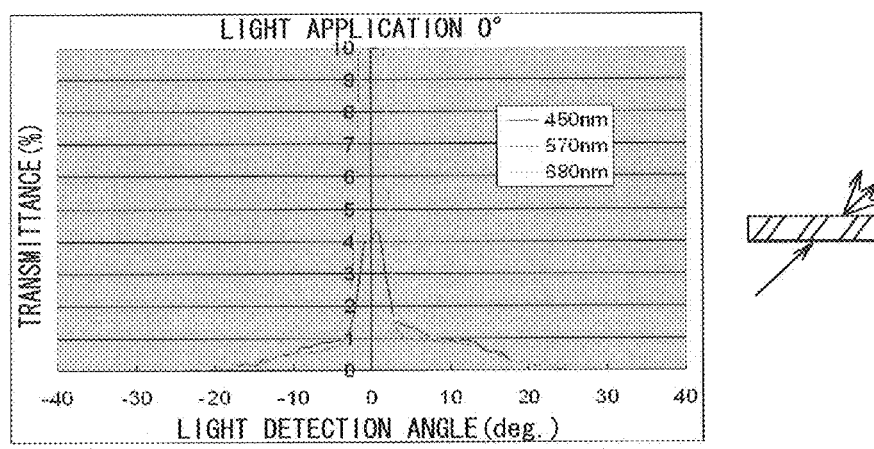 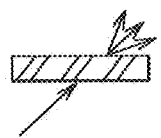
FIG. 8B 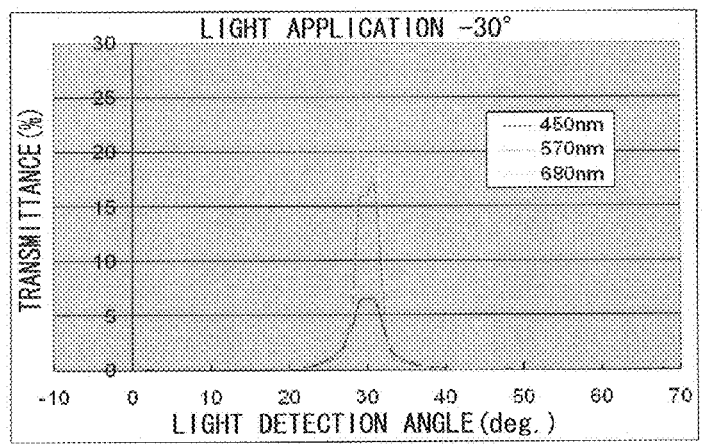 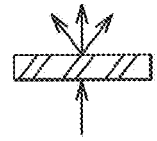

FIG. 9A
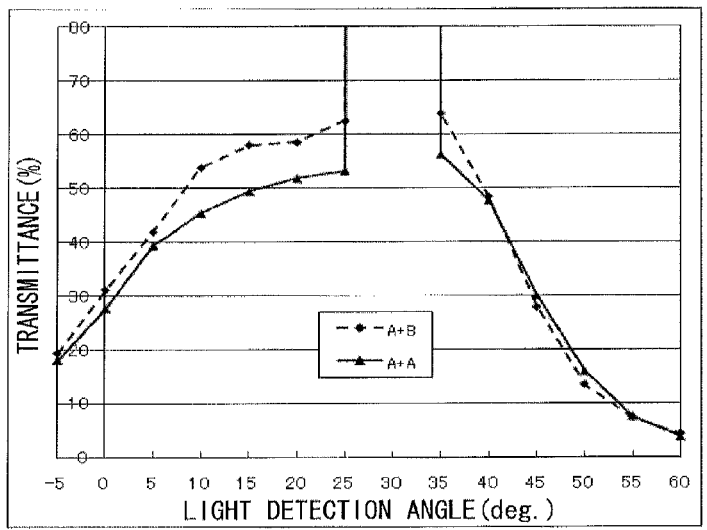
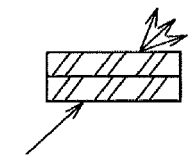
FIG. 9B
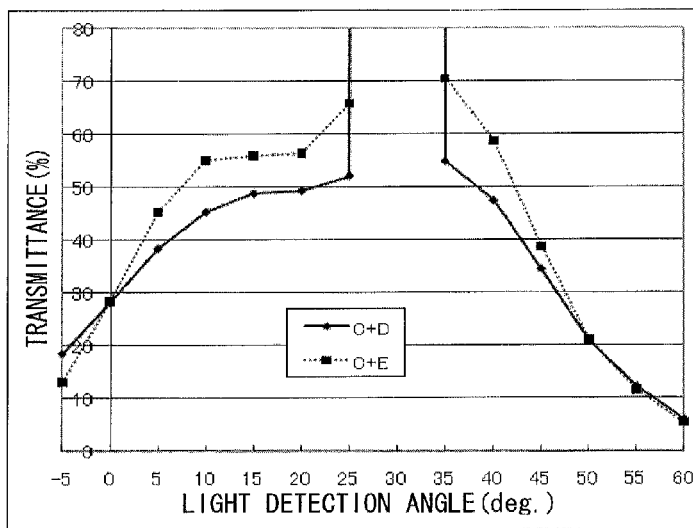
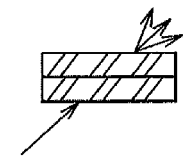

|   | ANGLE OF SCATTERING CENTRAL AXIS (deg.) | TRANSMITTANCE IN SCATTERING CENTRAL AXIS DIRECTION (deg.) |
|---|---|---|
| A | 20 | NORMAL |
| B | 20 | LOW |
| C | 30 | NORMAL |
| D | 15 | NORMAL |
| E | 15 | LOW |

FIG. 10

|   | 21 | 22 |   |
|---|---|---|---|
| A+B | A | B | ANGLE OF SCATTERING CENTRAL AXES ARE EQUAL, AND TRANSMITTANCES IN SCATTERING CENTRAL AXIS DIRECTION ARE DIFFERENT |
| A+A | A | A | ANGLE OF SCATTERING CENTRAL AXES ARE EQUAL, AND TRANSMITTANCES IN SCATTERING CENTRAL AXIS DIRECTION ARE EQUAL |
| C+D | C | D | ANGLE OF SCATTERING CENTRAL AXES ARE DIFFERENT, AND TRANSMITTANCES IN SCATTERING CENTRAL AXIS DIRECTION ARE EQUAL |
| C+E | C | E | ANGLE OF SCATTERING CENTRAL AXES ARE DIFFERENT, AND TRANSMITTANCES IN SCATTERING CENTRAL AXIS DIRECTION ARE DIFFERENT |

FIG. 11

DISPLAY AND ELECTRONIC UNIT

CROSS REFERENCES TO RELATED APPLICATIONS

The present application claims priority to Japanese Priority Patent Application JP 2011-075472 filed in the Japan Patent Office on Mar. 30, 2011, the entire content of which is hereby incorporated by reference.

BACKGROUND

The present application relates to a display including a reflective display panel or a semi-transmissive display panel having both a reflection section and a transmission section. Moreover, the technology relates to an electronic unit including the above-described display.

In recent years, displays for mobile units such as cellular phones and electronic papers have been in increasing demand, and attention has been given to reflective displays. The reflective displays perform display by reflecting externally incident light (ambient light) by a reflective plate, and do not need a backlight. Therefore, power consumption is reduced by power for the backlight; therefore, a mobile unit using the reflective display is allowed to be driven for a longer time than a mobile unit using a transmissive display. Moreover, as the backlight is not necessary, the weight and size of the display are allowed to be reduced accordingly.

In the reflective display, to perform display with use of external light, it is necessary to include a layer having a scattering function in the display. For example, in Japanese Unexamined Patent Application Publication Nos. H11-237623 and H09-113893, there are disclosed methods of providing a scattering film to a top surface of a glass substrate. In this case, the scattering film described in Japanese Unexamined Patent Application Publication No. H11-237623 is a front scattering film having more front scattering characteristics and less back scattering characteristics. The scattering film described in Japanese Unexamined Patent Application Publication No. H09-113893 is an anisotropic front scattering film scattering light incident from a specific direction.

SUMMARY

However, in the method described in Japanese Unexamined Patent Application Publication No. H11-237623, a scattering angle range includes all directions; therefore, sufficient luminance in white display is not obtained to cause a low contrast ratio. In the method described in Japanese Unexamined Patent Application Publication No. H09-113893, the scattering angle range is limited; therefore, higher white luminance than that in the method described in Japanese Unexamined Patent Application Publication No. H11-237623 is obtained. However, in reality, even in the method described in Japanese Unexamined Patent Application Publication No. H09-113893, compared to printed materials such as papers, white luminance is not sufficiently high; therefore, there is still room for improvement.

It is desirable to provide a display capable of obtaining high luminance in white display, and an electronic unit.

According to an embodiment of the technology, there is provided a display including: a reflective display panel; and an optical laminate disposed on the display panel. The optical laminate includes a plurality of anisotropic scattering films. Transmittances in a scattering central axis direction of two or more films of the plurality of anisotropic scattering films are different from each other.

According to an embodiment of the technology, there is provided an electronic unit including a display, the display including: a reflective display panel; and an optical laminate disposed on the display panel, in which the optical laminate includes a plurality of anisotropic scattering films, and transmittances in a scattering central axis direction of two or more films of the plurality of anisotropic scattering films are different from each other.

In the display and the electronic unit according to the embodiment of the technology, transmittances in a scattering central axis direction of two or more films of the plurality of anisotropic scattering films are different from each other. Therefore, when external light passes through a film with a relatively higher transmittance, light scattering is relatively reduced.

In the embodiment of the technology, a first film with a relatively higher transmittance in the scattering central axis direction of the anisotropic scattering films included in the optical laminate may be thinner than a second film with a relatively lower transmittance in the scattering central axis direction of the anisotropic scattering films included in the optical laminate. Moreover, in the embodiment of the technology, the first film may have a less clear texture configuration than the second film. Further, in the embodiment of the technology, the anisotropic scattering films may be front scattering films allowing external light incident from a specific direction in a relationship with the optical laminate to pass therethrough, and scattering, in a predetermined range with a scattering central axis as its center, light reflected by the display panel of the light having passed therethrough.

In the display and the electronic unit according to the embodiment of the technology, when external light passes through a film with a relatively higher transmittance, light scattering is relatively reduced; therefore, high luminance is allowed to be obtained in white display.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

FIGS. 7A and 7B are diagrams illustrating a working example of the transmittance of the other front scattering film.

FIGS. 8A and 8B are diagrams illustrating another working example of the transmittance of the other front scattering film.

FIGS. 9A and 9B are diagrams illustrating an example of transmittance of a laminate of two front scattering films.

FIG. 10 is a diagram illustrating characteristics of the front scattering films used in FIGS. 9A and 9B.

FIG. 11 is a diagram illustrating combinations of the front scattering films used in FIGS. 9A and 9B.

DETAILED DESCRIPTION

Figure 1:
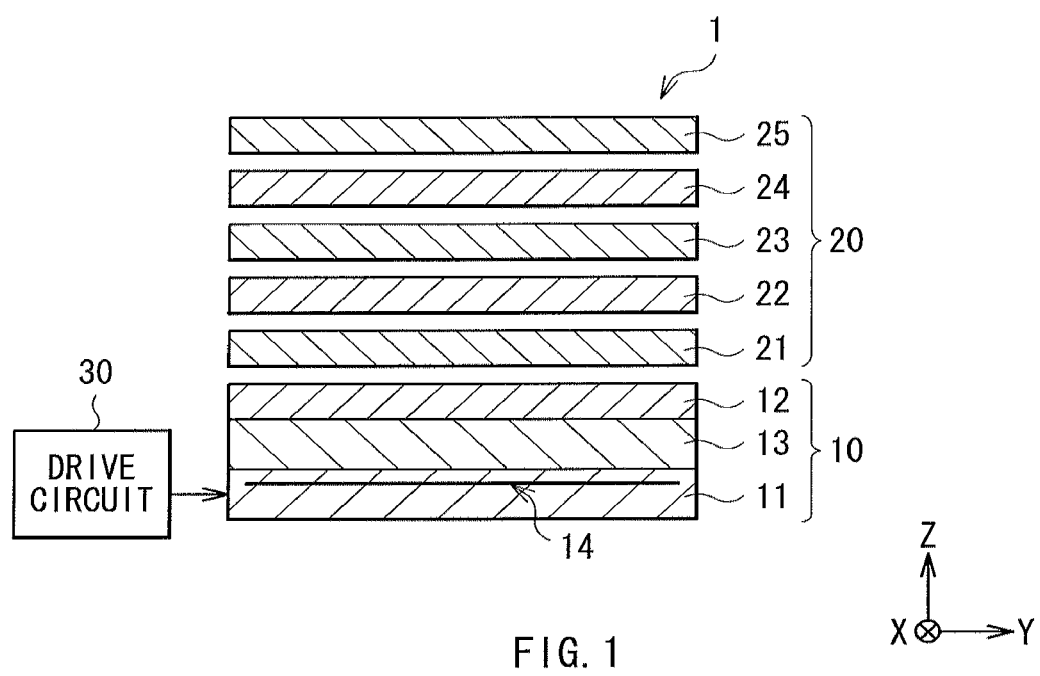
FIG. 1 is a sectional view illustrating an example of a configuration of a display according to an embodiment of the technology.

A preferred embodiment of the technology will be described in detail below referring to the accompanying drawings. It is to be noted that description will be given in the following order.
1. Embodiment (display)
An example in which transmittances in a scattering central axis direction of front scattering films are different from each other
2. Application Example (electronic unit)
An example in which the display according to the above-described embodiment is used in an electronic unit 1. Embodiment Configuration FIG. 1 illustrates an example of a sectional configuration of a display 1 according to an embodiment of the technology. It is to be noted that FIG. 1 is a schematic illustration, and dimensions and shapes in the illustration are not necessarily the same as actual dimensions and shapes. For example, as illustrated in FIG. 1, the display 1 includes a liquid crystal display panel 10, an optical laminate 20 disposed on the liquid crystal display panel 10, and a drive circuit 30 driving the liquid crystal display panel 10 in response to a picture signal.

In the display 1, a surface on a side farther from the liquid crystal display panel 10 of the optical laminate 20 is a picture display surface, and a light source such as a backlight is not disposed on a back side of the liquid crystal display panel 10. In other words, the liquid crystal display panel 10 is a reflective display panel displaying a picture by reflecting light incident from the picture display surface.
(Liquid Crystal Display Panel 10)

For example, as illustrated in FIG. 1, the liquid crystal display panel 10 includes a TFT (Thin Film Transistor) substrate 11 and an opposed substrate 12 which face each other with a predetermined gap in between, and a liquid crystal layer 13 disposed between the TFT substrate 11 and the opposed substrate 12.

The liquid crystal layer 13 is made of, for example, a nematic liquid crystal, and as will be described later, the liquid crystal layer 13 has a modulation function of allowing light incident to the liquid crystal layer 13 to pass therethrough or blocking the light from one pixel to another by a voltage applied from the drive circuit 30. It is to be noted that gradation of each pixel is adjusted by changing the light transmission level of the liquid crystal.

The TFT substrate 11 includes, for example, a plurality of pixel electrodes and pixel circuits provided to the pixel electrodes, respectively, on a substrate such as a glass substrate. The pixel circuits each include, for example, a TFT, a capacitive element, and the like. The TFT substrate 11 includes, for example, an alignment film. For example, as illustrated in FIG. 1, the TFT substrate 11 further includes a reflective layer 14 reflecting light incident from the liquid crystal layer 13. The opposed substrate 12 includes, for example, a common electrode on a surface on a side closer to the TFT substrate 11 of a substrate such as a glass substrate. The opposed substrate 12 includes, for example, an alignment film. The opposed substrate 12 further includes, for example, a color filter in a region facing the pixel electrode, and a light-shielding film in a region not facing the pixel electrode.

In this case, the substrate in the TFT substrate 11 may be made of a material other than the glass substrate, for example, a translucent resin substrate, quartz, or a silicon substrate. The substrate in the opposed substrate 12 may be made of a transparent material other than the glass substrate, for example, a translucent resin substrate, or quartz.

The plurality of pixel electrodes drive, together with the common electrode in the opposed substrate 12, the liquid crystal layer 13, and are two-dimensionally arranged in the TFT substrate 11. The common electrode is disposed to face the respective pixel electrodes. When a voltage is applied to the pixel electrodes and the common electrode by the drive circuit 30, an electrical field corresponding to a potential difference between the pixel electrodes and the common electrode is generated between the pixel electrodes and the common electrode, and the liquid crystal layer 13 is driven according to the magnitude of the electrical field. A portion corresponding to a portion where each pixel electrode and the common electrode face each other in the liquid crystal display panel 10 is a minimum unit where the liquid crystal layer is allowed to be partially driven by a voltage applied between the pixel electrode and the common electrode. This minimum unit corresponds to a pixel.

The reflective layer 14 may be configured of the pixel electrodes in the TFT substrate 11, or may be provided separately from the pixel electrodes. In the case where the reflective layer 14 is configured of the pixel electrodes, the pixel electrodes are made of a conductive material reflecting visible light. In the case where the reflective layer 14 is provided separately from the pixel electrodes, the pixel electrodes may be made of a metal material, or a conductive material transparent to visible light (for example, ITO (Indium Tin Oxide)). The common electrode is made of a conductive material transparent to visible light, for example, ITO.

The alignment films align liquid crystal molecules in the liquid crystal layer 13 in a predetermined direction, and are directly in contact with the liquid crystal layer 13. The alignment films are made of a polymer material such as polyimide, and are formed by performing a rubbing process on coated polyimide or the like. In the color filter, color filters separating light having passed through the liquid crystal layer 13 into, for example, three primary colors of red, green, and blue, respectively, are arranged corresponding to pixels, respectively. The light-shielding film has, for example, a function of absorbing visible light. The light-shielding film is formed between pixels.

(Optical Laminate 20)

For example, as illustrated in FIG. 1, the optical laminate 20 includes a front scattering film 21, a front scattering film 22, a λ/4 plate 23, a λ/2 plate 24, and a polarizing plate 25 in order from a side closer to the liquid crystal display panel 10. It is to be noted that the optical laminate 20 and the liquid crystal display panel 10 are bonded together with, for example, a glue or an adhesive. Likewise, members adjacent to each other in the optical laminate 20 are bonded together with, for example, a glue or an adhesive.

The λ/4 plate 23 is a uniaxially stretched film of a resin such as cycloolefin polymer or polycarbonate. The retardation of the λ/4 plate 23 is, for example, 0.14 μm, and is equivalent to approximately ¼ of the wavelength of green light having highest luminous efficiency in visible light. Therefore, the λ/4 plate 23 has a function of converting linearly polarized light incident from the polarizing plate 25 into circularly polarized light. The λ/2 plate 24 is, for example, a uniaxially stretched film of a polycarbonate resin. The retardation of the λ/2 plate 24 is, for example, 0.27 μm, and is equivalent to approximately ½ of the wavelength of green light having highest luminous efficiency in visible light. Herein, a combination of the λ/4 plate 23 and the λ/2 plate 24 has a function of converting linearly polarized light incident from the polarizing plate 25 into circularly polarized light, and functions as a (broadband) circular polarization plate for a wide-ranging wavelength as a whole.

The polarizing plate 25 has a function of absorbing a predetermined linearly polarized component, and allowing the other polarized component to pass therethrough. In other words, the polarizing plate 25 has a function of converting externally incident light into linearly polarized light. The polarizing plate 25 is configured by sandwiching, in TAC (triacetyl cellulose), a stretched polymer film of PVA (polyvinyl alcohol) with doping with a halogen material such as iodine or a dichroic dye.

The front scattering films 21 and 22 are anisotropic scattering films scattering light incident from a specific direction. When light enters the front scattering films 21 and 22 from a specific direction on the polarizing plate 25 side in a relationship with the optical laminate 20, the front scattering films 21 and 22 hardly scatter the incident light and allow the incident light to pass therethrough, and widely scatter the light returned by being reflected by the reflective layer 14.

Figure 2A:
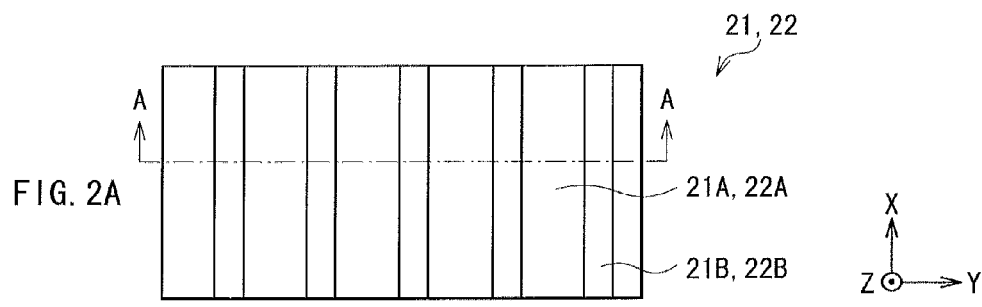
FIGS. 2A and 2B are a plan view and a sectional view illustrating an example of a configuration of a front scattering film, respectively.
Figure 2B:
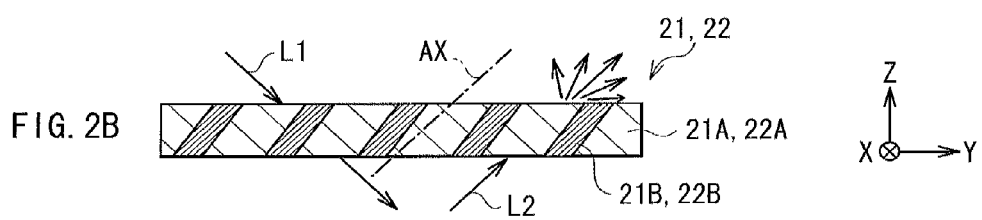
Figure 3A:
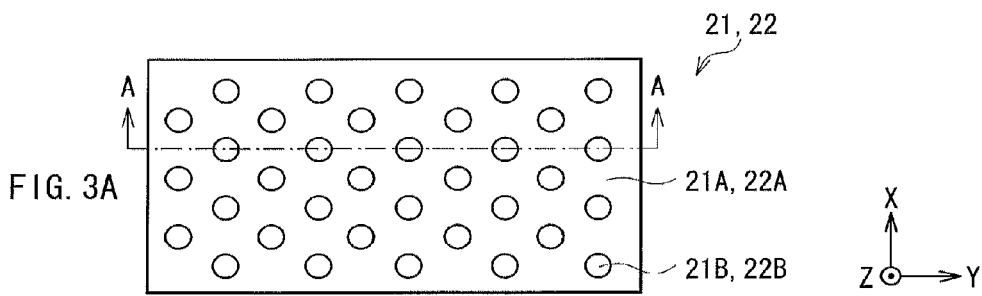
FIGS. 3A and 3B are a plan view and a sectional view illustrating another example of the configuration of the front scattering film.
Figure 3B:
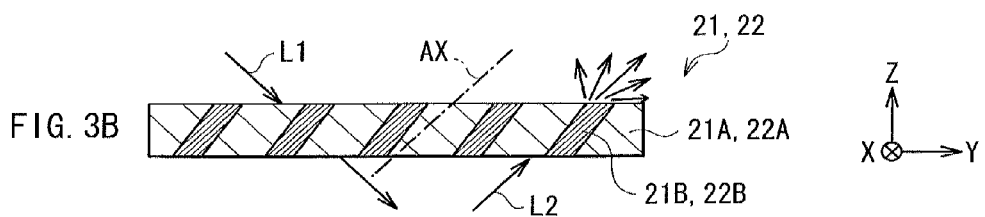

For example, as illustrated in FIGS. 2B and 3B, when external light L1 enters the front scattering films 21 and 22 from a first direction in a relationship with the display panel 10, the front scattering films 21 and 22 allow the external light L1 to pass therethrough, and the front scattering films 21 and 22 scatter, in a predetermined range with a scattering central axis AX as its center, light L2, which is light reflected by the reflective layer 14, of the light L1 having passed through the front scattering films 21 and 22. The external light L1 is parallel light incident to the polarizing plate 25. The external light L1 may be non-polarized light or polarized light. Moreover, the first direction indicates a direction within a limited angle range in a direction of a quadrant having a negative Y-coordinate and a positive Z-coordinate in FIGS. 2B and 3B.

For example, as illustrated in FIGS. 2A and 2B or FIGS. 3A and 3B, the front scattering film 21 includes two kinds of regions (first regions 21A and second regions 21B) having different refractive indices from each other. Likewise, for example, as illustrated in FIGS. 2A and 2B or FIGS. 3A and 3B, the front scattering film 22 includes two kinds of regions (first regions 22A and second regions 22B) having different refractive indices from each other. It is to be noted that FIGS. 2A and 3A illustrate examples of top configurations of the front scattering films 21 and 22. Moreover, FIGS. 2B and 3B illustrate examples of sectional configurations of the front scattering films 21 and 22. Further, FIGS. 2A and 2B illustrate an example of a configuration in the case where the front scattering films 21 and 22 have a louver configuration. FIGS. 3A and 3B illustrate an example of a configuration in the case where the front scattering films 21 and 22 have a columnar configuration.

For example, the front scattering film 21 is formed by extending the first regions 21A and the second regions 21B in a thickness direction and inclining them in a predetermined direction. For example, the front scattering film 22 is formed by extending the first regions 22A and the second regions 22B in a thickness direction and inclining them in a predetermined direction.

For example, the front scattering films 21 and 22 are formed by applying ultraviolet rays from an oblique direction to a resin sheet made of a mixture of two or more kinds of photopolymerizable monomers or oligomers having different refractive indices from each other. It is to be noted that the front scattering films 21 and 22 may have a configuration different from the above-described configurations, or may be manufactured by a method different from the above-described method. The configurations of the front scattering films 21 and 22 may be same as or different from each other.

The directions of the scattering central axes AX of the front scattering films 21 and 22 may be the same as or different from each other. Moreover, the first regions 21A of the front scattering film 21 and the first regions 22A of the front scattering film 22 may have refractive indices equal to or different from each other. Further, the second regions 21B of the front scattering film 21 and the second regions 22B of the front scattering film 22 may have refractive indices equal to or different from each other. Moreover, a refractive-index difference between the first regions 21A and the second regions 21B of the front scattering film 21 and a refractive-index difference between the first regions 22A and the second regions 22B of the front scattering film 22 may be equal to or different from each other. A configuration pitch in the front scattering film 21 and a configuration pitch in the front scattering film 22 may be equal to or different from each other.

Figure 4:
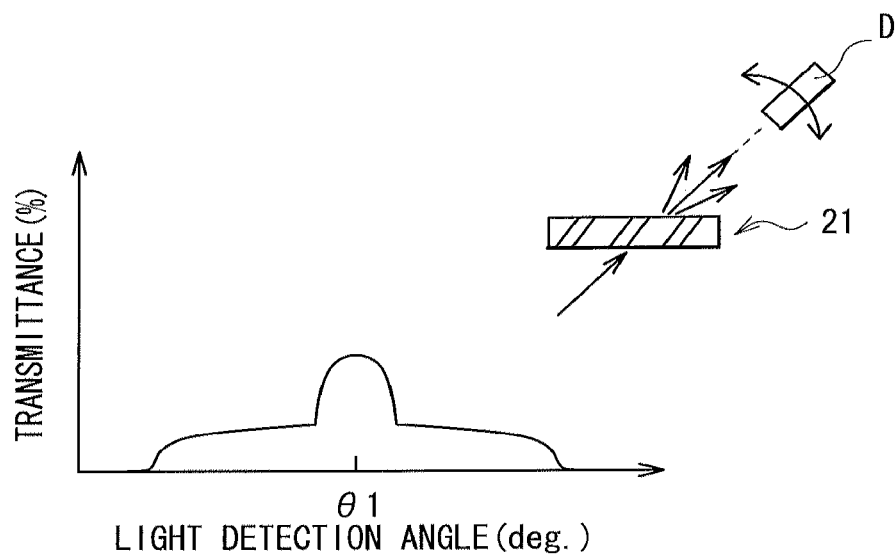
FIG. 4 is a diagram illustrating an example of transmittance of one front scattering film.
Figure 5:
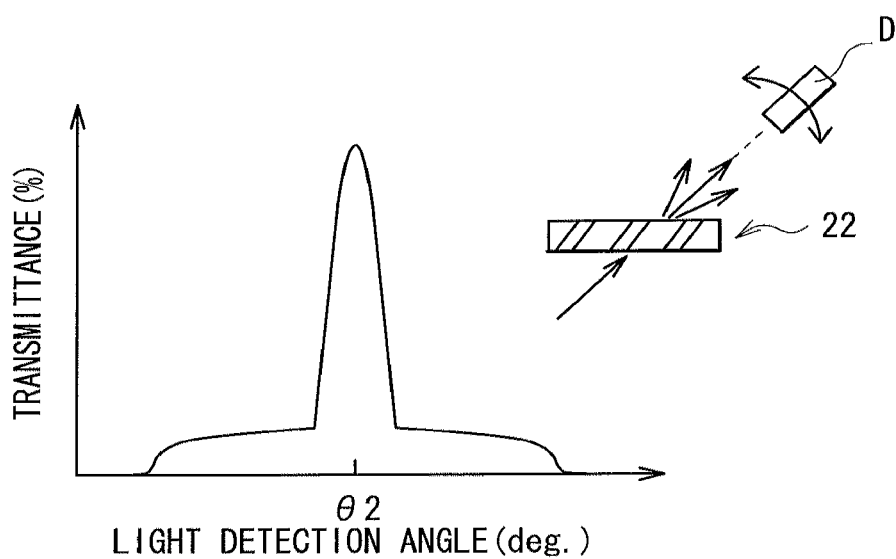
FIG. 5 is a diagram illustrating an example of the transmittance of the other front scattering film.

FIG. 4 illustrates an example of a transmittance distribution when light enters the front scattering film 21 at an angle θ1 equal to an angle between the scattering central axis AX of the front scattering film 21 and a normal to the front scattering film 21. FIG. 5 illustrates an example of a transmittance distribution when light enters the front scattering film 22 at an angle θ2 equal to an angle between the scattering central axis AX of the front scattering film 22 and a normal to the front scattering film 22. In FIGS. 4 and 5, a horizontal axis indicates an angle which an optical axis of a photodetector D when the photodetector D detects light having passed through the front scattering film 21 or 22 forms with the normal to the front scattering film 21 or 22. It is to be noted that θ1 and θ2 may be equal to or different from each other.

It is obvious from FIGS. 4 and 5 that a transmittance in the scattering central axis AX direction of the front scattering film 22 is relatively higher than a transmittance in the scattering central axis AX direction of the front scattering film 21. In other words, the front scattering film 22 has a lower haze than the front scattering film 21.

Figure 6A:
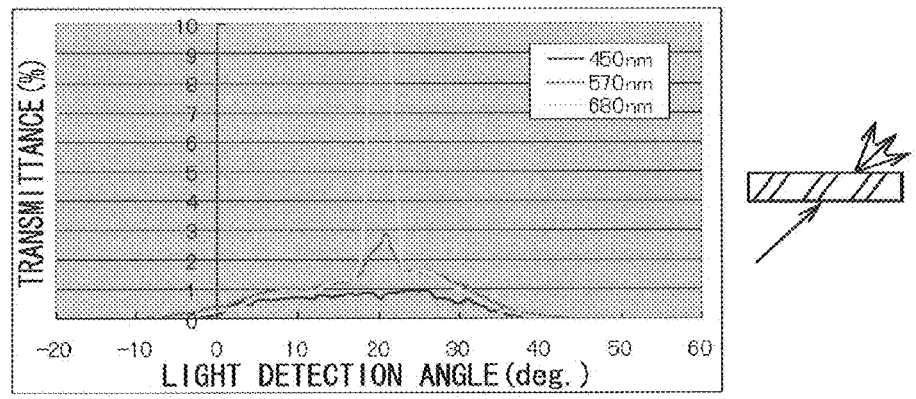
FIGS. 6A and 6B are diagrams illustrating a working example of the transmittance of the one front scattering film.
Figure 6B:
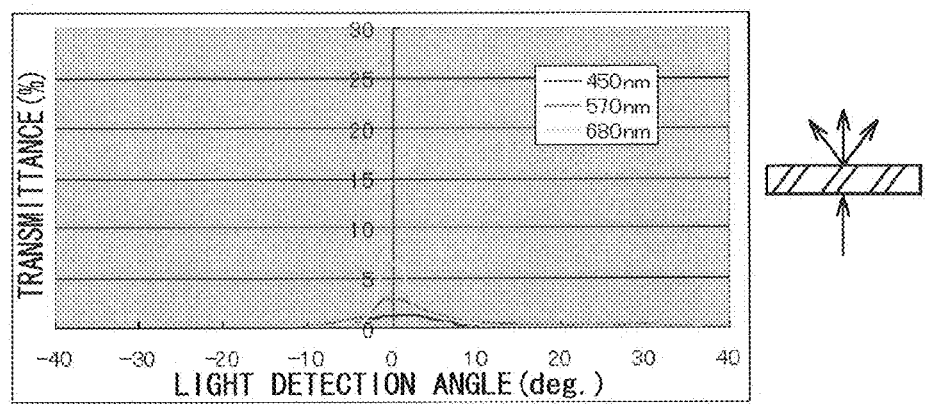

FIG. 6A illustrates a working example of a transmittance distribution when light enters the front scattering film 21 at an angle equal to an angle between the scattering central axis AX of the front scattering film 21 and the normal to the front scattering film 21 in the case where the front scattering film 21 has a columnar configuration. FIG. 6B illustrates a working example of a transmittance distribution when light enters the front scattering film 21 at a different angle (0°) from the angle between the scattering central axis AX of the front scattering film 21 and the normal to the front scattering film 21 in the case where the front scattering film 21 has a columnar configuration. FIGS. 7A and 8A illustrate working examples of a transmittance distribution when light enters the front scattering film 22 at an angle equal to an angle between the scattering central axis AX of the front scattering film 22 and the normal to the front scattering film 22 in the case where the front scattering film 22 has a columnar configuration. FIGS. 7B and 8B illustrate working examples of a transmittance distribution when light enters the front scattering film 22 at a different angle from the angle between the scattering central axis AX of the front scattering film 22 and the normal to the front scattering film 22 in the case where the front scattering film 22 has a columnar configuration.

FIGS. 7A and 7B illustrate results when a texture configuration (borders between the first regions 22A and the second region 22B) of the front scattering film 22 are less clear (less sharp) than a texture configuration (borders between the first regions 21A and the second regions 21B) of the front scattering film 21. It is to be noted that, in FIGS. 7A and 7B, the texture configurations of the front scattering films 21 and 22 are the same as each other, except for the borders, and the thicknesses of the front scattering films 21 and 22 are equal to each other. On the other hand, FIGS. 8A and 8B illustrate results when the thickness of the front scattering film 22 is smaller than that of the front scattering film 21 (for example, the thickness of the front scattering film 22 is approximately a half of the thickness of the front scattering film 21). It is to be noted that, in FIGS. 8A and 8B, the texture configurations of the front scattering films 21 and 22 are the same as each other.

It is obvious from FIGS. 6A and 6B to FIGS. 8A and 8B that in any of wavelength bands of 450 nm, 570 nm, and 680 nm, the transmittance in the scattering central axis AX direction of the front scattering film 22 is relatively higher than the transmittance in the scattering central axis AX direction of the front scattering film 21.

FIGS. 9A and 9B illustrate a working example of a transmittance distribution when light enters a surface on the front scattering film 21 side of a laminate of the front scattering films 21 and 22 at an angle equal to the angle θ1 between the scattering central axis AX and the normal to the front scattering film 21. A, B, C, D, and E in FIGS. 9A and 9B represent kinds of the front scattering films 21 and 22, more specifically, A, B, C, D, and E have characteristics illustrated in FIG. 10. Moreover, "A+A", "A+B", "C+E", and "C+D" in FIGS. 9A and 9B represent combinations of the front scattering films 21 and 22, and have characteristics illustrated in FIG. 11.

It is obvious from FIGS. 9A and 9B that irrespective of whether the directions of the scattering central axes AX of the front scattering films 21 and 22 are equal to or different from each other, light transmittance at a different angle from the scattering central axis AX is higher in the case where transmittances in the scattering central axis AX direction are different from each other than in the case where the transmittances in the scattering central axis AX direction are equal to each other. This means that in the case where the transmittances in the scattering central axis AX direction are different from each other, a normal-direction component of light emitted from a picture display surface of the optical laminate 20 is larger, and white luminance in a front direction is higher.

[Functions and Effects]

Next, functions and effects of the display 1 according to the embodiment will be described below.

In the embodiment, for example, the external light L1 incident from a specific direction is converted into linearly polarized light by the polarizing plate 25, and further into circularly polarized light by the λ/2 plate 24 and the λ/4 plate 23, and then the circularly polarized light passes through the front scattering films 22 and 21 to enter the liquid crystal display panel 10. The light incident to the liquid crystal display panel 10 is modulated by the liquid crystal layer 13 in response to a picture signal, and is reflected by the reflective layer 14 to enter the front scattering films 22 and 21. The light incident to the front scattering films 22 and 21 is diffused by the front scattering films 22 and 21 in a predetermined angle range, and then the light is converted into linearly polarized light by the λ/2 plate 24 and the λ/4 plate 23 to exit through the polarizing plate 25.

Figure 12:
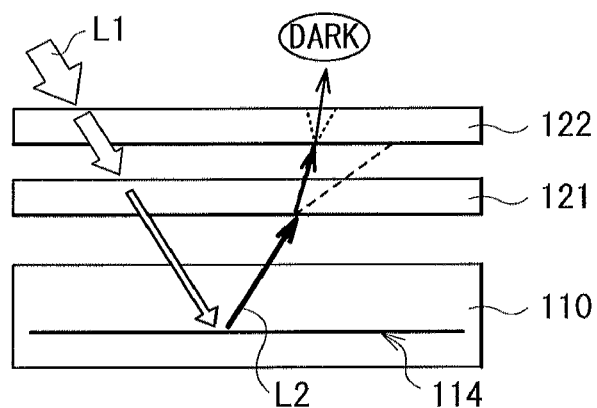
FIG. 12 is a schematic view for describing a function of a display according to a comparative example.

In a display in related art, for example, as illustrated in FIG. 12, as two front scattering films 121 and 122 on a reflective liquid crystal display panel 110, films with a high haze value are used to expand a diffusion range. However, in the case where two front scattering films 121 and 122 with a high haze value are used, transmittance is inevitably reduced; therefore, when the external light L1 passes through the front scattering films 121 and 122, the amount of light reaching a reflective layer 114 in the liquid crystal display panel 110 is reduced. As a result, the amount of light diffused by the front scattering films 121 and 122 to be emitted in a front direction, of the light L2 reflected by the reflective layer 114 is reduced, and sufficient luminance is not allowed to be obtained in white display. Therefore, it is considered to reduce the haze values of both of the front scattering films 121 and 122. However, by doing so, the external light L1 is hardly scattered by the front scattering films 121 and 122 and passes through the front scattering films 121 and 122; therefore, the amount of light emitted in the scattering central axis direction is pronouncedly large, and the amount of light emitted in the front direction is still small. Therefore, in this case, sufficient luminance is not allowed to be obtained in white display.

Figure 13:
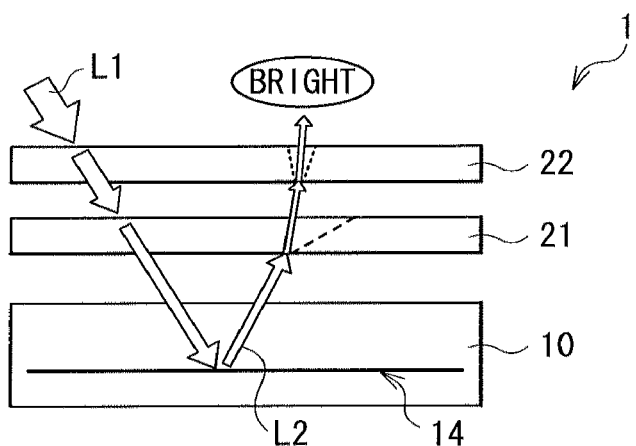
FIG. 13 is a schematic view for describing a function of the display in FIG. 1.

On the other hand, in the embodiment, the haze value of the front scattering film 22 is higher than that of the front scattering film 21. More specifically, as illustrated in FIGS. 4 and 5, the transmittance in the scattering central axis AX direction of the front scattering film 22 is higher than the transmittance in the scattering central axis AX direction of the front scattering film 21. For example, the front scattering film 22 with a higher transmittance has a smaller thickness or a less clear texture configuration than the front scattering film 21 with a lower transmittance. Therefore, for example, as illustrated in FIG. 13, the amount of light reaching the reflective layer 14 through the front scattering films 21 and 22 of the external light L1 is increased. As a result, the amount of light diffused by the front scattering films 21 and 22 to be emitted in the front direction, of the light L2 reflected by the reflective layer 14 is increased; therefore, high luminance is allowed to be obtained in white display.

[Modifications]

(First Modification)

In the above-described embodiment, the case where the transmittance in the scattering central axis AX direction of the front scattering film 22 is relatively higher than the transmittance in the scattering central axis AX direction of the front scattering film 21 is exemplified. However, the transmittance in the scattering central axis AX direction of the front scattering film 21 may be relatively higher than the transmittance in the scattering central axis AX direction of the front scattering film 22. Even in such a case, the amount of light reaching the reflective layer 14 through the front scattering film 22 of the external light L1 is increased. As a result, the amount of light diffused by the front scattering films 21 and 22 to be emitted in the front direction, of the light L2 reflected by the reflective layer 14 is increased; therefore, high luminance is allowed to be obtained in white display.

(Second Modification)

In the above-described embodiment, two front scattering films 21 and 22 are included in the optical laminate 20; however, three or more front scattering films may be included in the optical laminate 20. However, in this case, in two or more of the three or more front scattering films, it is only necessary for a transmittance in a scattering central axis direction of one front scattering film to be relatively higher than a transmittance in a scattering central axis direction of the other front scattering film.

(Third Modification)

In the above-described embodiment, in the case where light enters the front scattering films 21 and 22 from a specific direction on the polarizing plate 25 side in a relationship with the optical laminate 20, the front scattering films 21 and 22 hardly scatter the incident light and allow the incident light to pass therethrough, and the front scattering films 21 and 22 widely scatter the light returned by being reflected by the reflective layer 14. However, in the case where light enters the front scattering films 21 and 22 from a specific direction on the polarizing plate 25 side in a relationship with the optical laminate 20, the front scattering films 21 and 22 may widely scatter the incident light, and may hardly scatter the light returned by being reflected by the reflective layer 14, and may allow the light to pass therethrough.

Figure 14:
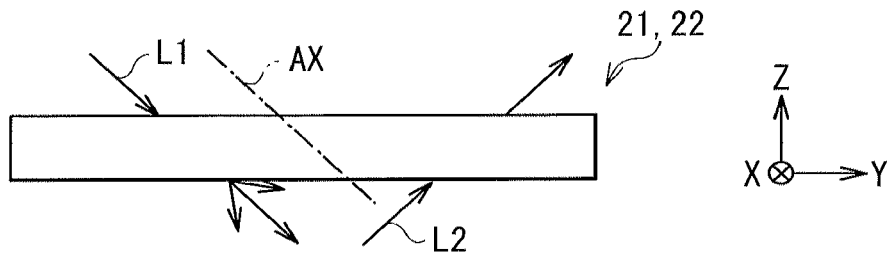
FIG. 14 is a sectional view illustrating another example of a function of the front scattering film in FIGS. 2A and 2B.

For example, as illustrated in FIG. 14, in the case where the external light L1 enters the front scattering films 21 and 22 from the first direction in a relationship with the display panel 10, the front scattering films 21 and 22 may scatter the incident light L1 in a predetermined range with a scattering central axis AX as its center, and may allow the light returned by being reflected by the reflective layer 14 to pass therethrough.

Figure 15:
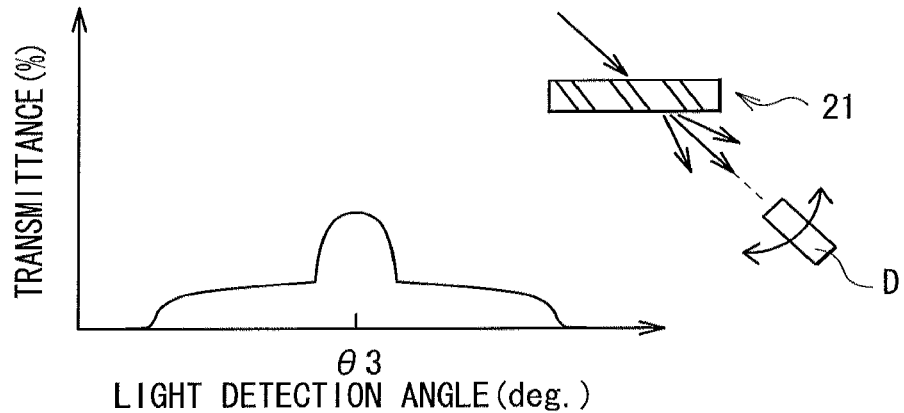
FIG. 15 is a diagram illustrating an example of transmittance of the front scattering film in FIG. 14.
Figure 16:
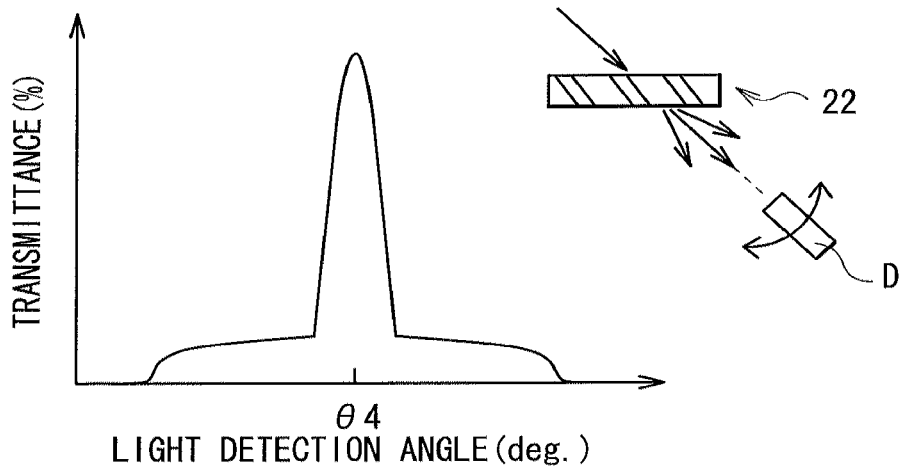
FIG. 16 is a diagram illustrating another example of the transmittance of the front scattering film in FIG. 14.

FIG. 15 illustrates an example of a transmittance distribution when light enters the front scattering film 21 at an angle θ3 equal to the angle between the scattering central axis AX of the front scattering film 21 and the normal to the front scattering film 21. FIG. 16 illustrates an example of a transmittance distribution when light enters the front scattering film 22 at an angle θ4 equal to the angle between the scattering central axis AX of the front scattering film 22 and the normal to the front scattering film 22. In FIGS. 15 and 16, a horizontal axis indicates an angle which an optical axis of a photodetector D when the photodetector D detects light having passed through the front scattering films 21 and 22 forms with the normal to the front scattering film 21 or 22. It is to be noted that θ3 and θ4 may be equal to or different from each other.

It is obvious from FIGS. 15 and 16 that the transmittance in the scattering central axis AX direction of the front scattering film 22 is relatively higher than the transmittance in the scattering central axis AX direction of the front scattering film 21. In other words, the front scattering film 22 has a lower haze than the front scattering film 21. Even in the case where the front scattering films 21 and 22 have such characteristics, the amount of light reaching the reflective layer 14 through the front scattering film 22 of the external light L1 is increased. As a result, the amount of light diffused by the front scattering films 21 and 22 to be emitted in the front direction, of the light L2 reflected by the reflective layer 14 is increased; therefore, high luminance is allowed to be obtained in white display.

(Fourth Modification)

In the above-described embodiment, the λ/2 plate 24 is disposed between the λ/4 plate 23 and the polarizing plate 25; however, the λ/2 plate 24 may be removed, if necessary. Moreover, in the above-described embodiment, a layer of some kind may be further included in the optical laminate 20, if necessary.

2. Application Example

Figure 17:
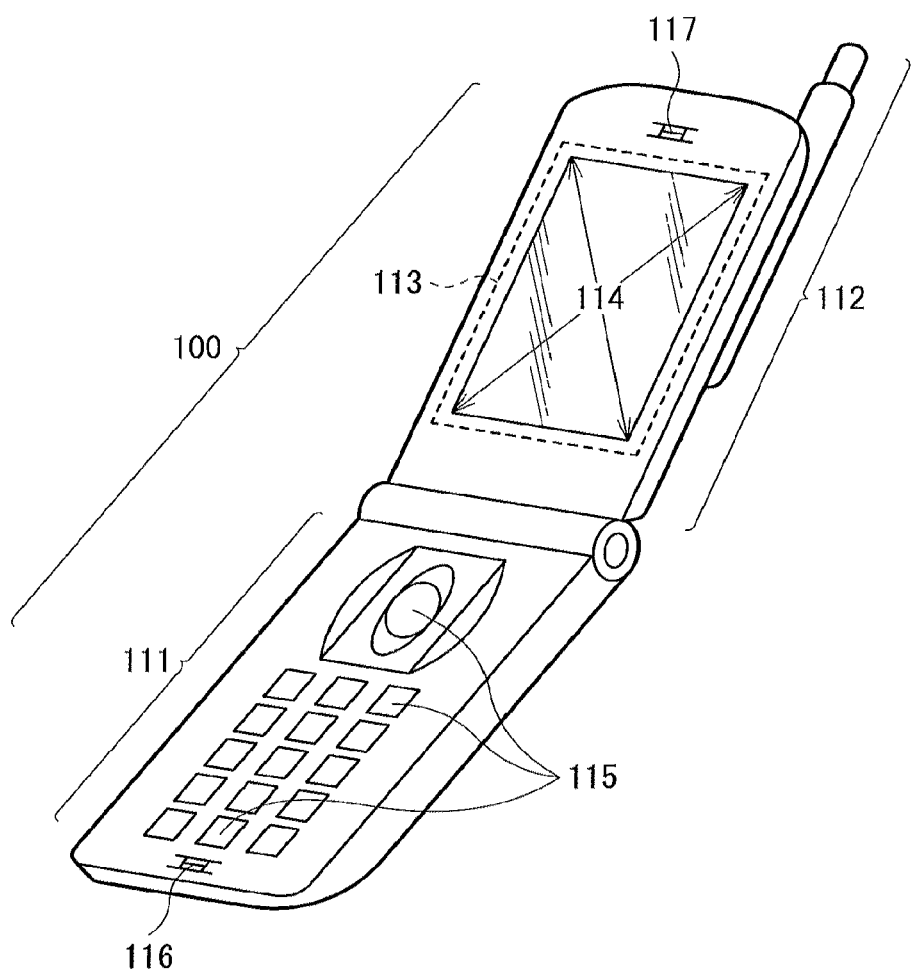
FIG. 17 is a perspective view illustrating an example of a configuration of an electronic unit according to an application example.

Next, an application example of the display 1 according to any of the above-described embodiment and modifications thereof will be described below. FIG. 17 is a schematic perspective view of an example of a configuration of an electronic unit 100 according to the application example. The electronic unit 100 is a cellular phone, and, for example, as illustrated in FIG. 17, the electronic unit 100 includes a main body 111, and a display section 112 openable and closable with respect to the main body 111. The main body 111 includes operation buttons 115 and a transmitter section 116. The display section 112 includes a display 113 and a receiver section 117. The display 113 displays various indications for telephone communication on a display screen 114 thereof. The electronic unit 100 includes a control section (not illustrated) to control the operation of the display 113. The control section is disposed in the main body 111 or the display section 112 as a part of a control section controlling the whole electronic unit 100 or a control section different from the control section controlling the whole electronic unit 100.

The display 113 has the same configuration as that of the display 1 according to any of the above-described embodiment and modifications thereof. Therefore, in the display 113, high luminance is allowed to be obtained in white display.

It is to be noted that, in addition to the above-described cellular phone, electronic units to which the display 1 according to any of the above-described embodiment and modifications thereof is applicable include a personal computer, a liquid crystal television, a viewfinder type or monitor direct-view type videotape recorder, a car navigation system, a pager, an electronic organizer, an electronic calculator, a word processor, a work station, a videophone, a POS terminal, and the like.

Although the present application is described referring to the embodiment, the modifications thereof, and the application examples, the technology is not limited thereto, and may be variously modified. For example, in the above-described embodiment and the like, the case where the technology is applied to the reflective liquid crystal display panel 10 is described as an example; however, the technology is applicable to a semi-transparent liquid crystal display panel. For example, the technology is applicable to a semi-transparent liquid crystal display panel having a configuration similar to the reflective liquid crystal display panel 10 as a reflection section, and including a transmission section with the reflection section.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display comprising:
   a reflective display panel; and
   an optical laminate disposed on the display panel, the optical laminate including a plurality of anisotropic scattering films including at least:
   a first film; and
   a second film that has a lower transmittance in a scattering central axis direction of the anisotropic scattering films than a transmittance of the first film in the scattering central axis direction of the anisotropic scattering films,
   wherein each of the first film and the second film includes:
   first regions; and
   second regions that have different refractive indexes from the first regions,
   wherein each of first regions and second regions are arranged adjacent to each other in a first direction crossing a second direction that is a thickness direction of the first film and the second film, and
   wherein first borders in the first film between the first regions and the second regions are less sharp than second borders in the second film between the first regions and the second regions.

2. The display according to claim 1, wherein the first film is thinner than the second film.

3. The display according to claim 1, wherein
   the anisotropic scattering films are front scattering films allowing external light incident from a specific direction in a relationship with the optical laminate to pass therethrough, and scattering, in a predetermined range with a scattering central axis as its center, light reflected by the display panel of the light having passed therethrough.

4. The display according to claim 1, wherein
   the anisotropic scattering films are front scattering films scattering, in a predetermined range with a scattering central axis as its center, external light incident from a predetermined direction in a relationship with the optical laminate, and allowing light reflected by the display panel of the scattered light to pass therethrough.

5. The display according to claim 1, wherein
   each of the first regions has a louver structure.

6. The display according to claim 1, wherein
   each of the second regions has a louver structure.

7. The display according to claim 1, wherein
   each of the first regions and the second regions extends in a third direction crossing the first direction in a plan view and arranged in the first direction.

8. The display according to claim 1, wherein
   each of the second regions has a columnar structure.

9. The display according to claim 1, wherein
   the second regions are arranged in a dot pattern in a plan view and are surrounded by the first regions.

10. An electronic unit including a display, the display comprising:
    a reflective display panel; and
    an optical laminate disposed on the display panel, the optical laminate including a plurality of anisotropic scattering films including at least:
    a first film; and
    a second film that has a lower transmittance in a scattering central axis direction of the anisotropic scattering films than a transmittance of the first film in the scattering central axis direction of the anisotropic scattering films,
    wherein each of the first film and the second film includes:
    first regions; and
    second regions that have different refractive indexes from the first regions,
    wherein each of first regions and second regions are arranged adjacent to each other in a first direction crossing a second direction that is a thickness direction of the first film and the second film, and
    wherein first borders in the first film between the first regions and the second regions are less sharp than second borders in the second film between the first regions and the second regions.

* * * * *